(12) United States Patent
Erbrick

(10) Patent No.: US 7,946,039 B2
(45) Date of Patent: May 24, 2011

(54) HAND-HELD RATCHET TOOL FOR MOVING A PAIR OF JAW MEMBERS TOWARD AND AWAY FROM EACH OTHER

(75) Inventor: Robert S. Erbrick, Pipersville, PA (US)

(73) Assignee: Electroline Corporation, Pipersville, PA (US)

( * ) Notice: Subject to any disclaimer, the term of this patent is extended or adjusted under 35 U.S.C. 154(b) by 425 days.

(21) Appl. No.: 12/142,399

(22) Filed: Jun. 19, 2008

(65) Prior Publication Data

US 2009/0313835 A1  Dec. 24, 2009

(51) Int. Cl.
*B26B 13/28* (2006.01)
(52) U.S. Cl. .................................. 30/251; 30/252
(58) Field of Classification Search ................ 30/98, 99, 30/251, 261, 252; 74/575–578; 81/314
See application file for complete search history.

(56) References Cited

U.S. PATENT DOCUMENTS

| | | | | | |
|---|---|---|---|---|---|
| 1,762,862 | A | * | 6/1930 | Gluck | 235/33 |
| 1,909,846 | A | * | 5/1933 | Porter | 30/252 |
| 2,197,128 | A | * | 4/1940 | Harrison | 81/314 |
| 2,246,730 | A | * | 6/1941 | Hafdell | 30/237 |
| 2,308,684 | A | | 1/1943 | Geddes | |
| 2,705,432 | A | * | 4/1955 | Lazar | 81/313 |
| 4,176,450 | A | | 12/1979 | Muromoto | |
| 4,178,682 | A | | 12/1979 | Sadauskas | |
| 4,186,484 | A | * | 2/1980 | Tanaka | 30/92 |
| 4,899,445 | A | | 2/1990 | Erbrick et al. | |
| 5,195,353 | A | | 3/1993 | Erbrick et al. | |
| 5,307,565 | A | | 5/1994 | Erbrick et al. | |
| 5,319,997 | A | * | 6/1994 | Galloway et al. | 74/577 S |
| 5,590,470 | A | | 1/1997 | Erbrick et al. | |
| 6,178,643 | B1 | | 1/2001 | Erbrick et al. | |
| 6,971,179 | B2 | | 12/2005 | Erbrick | |
| 7,346,987 | B2 | | 3/2008 | Erbrick | |
| 2008/0184567 | A1 | * | 8/2008 | Jou | 30/262 |
| 2011/0001022 | A1 | * | 1/2011 | Edinger | 248/103 |

\* cited by examiner

*Primary Examiner* — Kenneth E. Peterson
*Assistant Examiner* — Sean Michalski
(74) *Attorney, Agent, or Firm* — Panitch Schwarze Belisario & Nadel LLP

(57) ABSTRACT

A ratchet tool has a first jaw member pivotally mounted on a first handle. An elongate linkage has a first end pivotally mounted on a second handle and a second end pivotally connected with a second jaw member on the first jaw member. The second jaw member includes a plurality of ratchet teeth. A pawl is pivotally mounted on the second end of the second handle along with the elongate linkage. The pawl has first and second sets of ratchet teeth alternatively engageable with the second jaw member teeth by a pivotally mounted spring and a rotatable actuator with cams that can be rotated into over center positions with respect to the spring and held there by the spring and a stop engaged by the actuator.

20 Claims, 3 Drawing Sheets

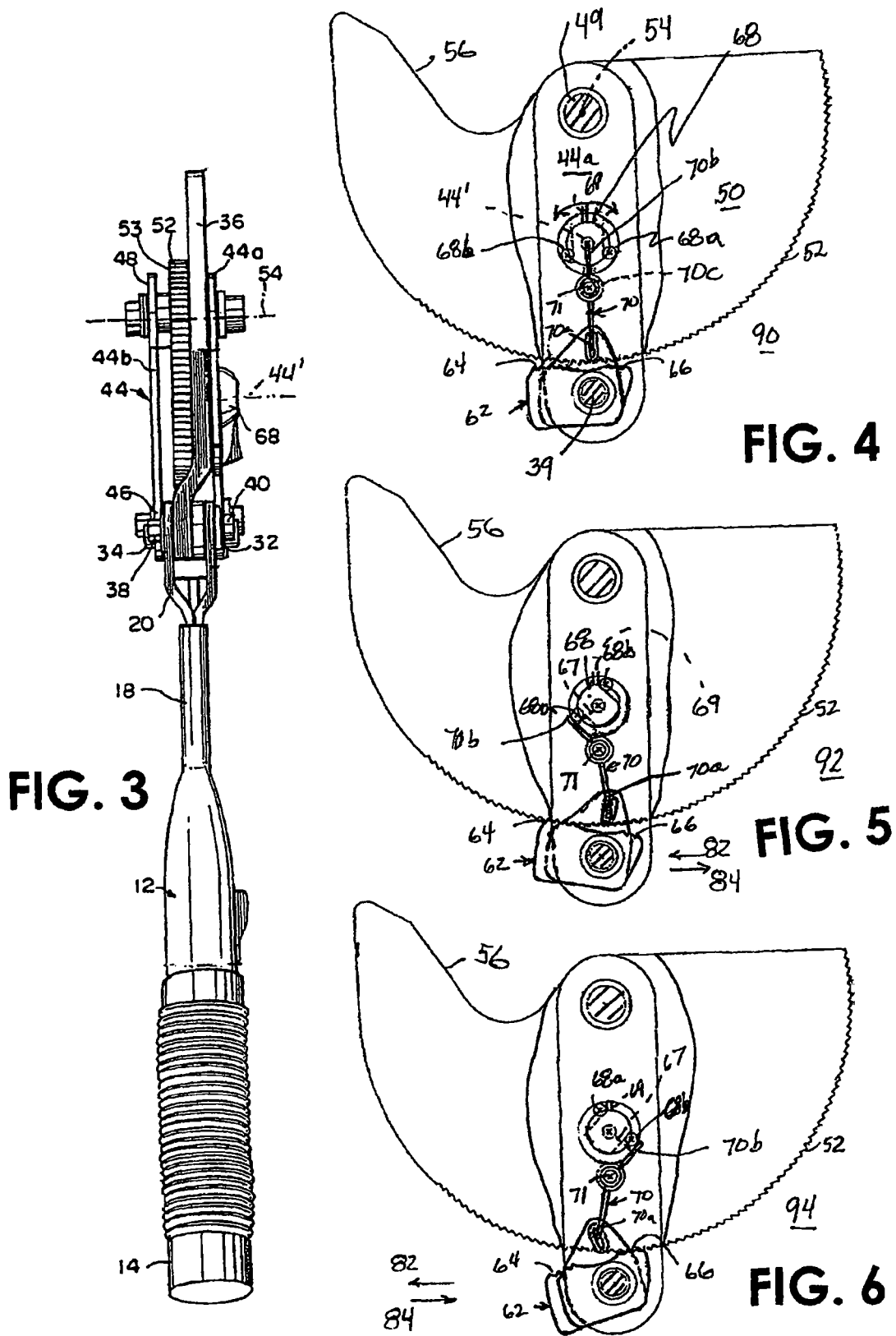

HAND-HELD RATCHET TOOL FOR MOVING A PAIR OF JAW MEMBERS TOWARD AND AWAY FROM EACH OTHER

BACKGROUND OF THE INVENTION

In the cable cutting field, there exists a need for a cable cutter which includes a ratchet mechanism for controlling the movement of the working surfaces of the jaw members toward and away from each other. There further exists a need for a hand-held ratchet tool wherein the relative movement between the jaw members is inhibited to thereby control the time within which it takes to cut a cable and to limit the handle stroke to the area where the most cutting force is generated.

Hand-held cable cutting ratchet tools are known. One is disclosed in U.S. Pat. No. 4,899,445, which is incorporated by reference herein in its entirety. This tool solved may drawbacks suffered by earlier cable cutting hand-held ratchet tools which could only move their jaw members toward each other or towards a closed position. The jaws of earlier cable cutting hand-held ratchet tools are moved away from each other by hand or are spring released whereas the jaws of the tool disclosed in U.S. Pat. No. 4,899,445 could be ratcheted open and closed. The tool disclosed in U.S. Pat. No. 4,899,445 was easier and less expensive to manufacture than the earlier spring-released ratchet tools and safer to operate since the jaw members of earlier tools were not always totally controlled by the user.

The tool of U.S. Pat. No. 4,899,445 utilized a leaf spring actuator to engage and disengage a pawl. The leaf spring could not be made too strong because then it could force itself out of its neutral position and into an unplanned engagement of the pawl. If made too week, it might allow the pawl to release prematurely. As safe as the tool is, it would be beneficial if the safety of the tool disclosed in U.S. Pat. No. 4,899,445 could be improved, particularly without diminishing any of its capabilities.

SUMMARY OF THE INVENTION

Briefly stated, the present invention, in one embodiment, is a hand-held ratchet tool for controllably moving working surfaces of a pair of jaw members toward and away from each other, the hand-held ratchet tool comprising: a first elongated handle having a first end and a second end; a second elongated handle having a first end and a second end, the second end of the first handle being pivotally connected to the second end of the second handle; a first jaw member pivotally mounted on the second end of the first handle, the first jaw having a first working surface; an elongate linkage having a first end and an opposing second end, the first end being mounted on the second end of the second handle by a pivotal connection so as to pivot the elongate linkage about an axis through the second end of the handle; a second jaw member having an outer perimeter including a plurality of ratchet teeth and a second working surface, the second jaw member and the second end of the elongate linkage being connected with the first jaw member to pivot on the first jaw member along a common pivot axis; a pawl having a first set of ratchet teeth and a separate second set of ratchet teeth, the pawl being mounted on the second end of the second handle so as to pivot on the axis of the pivotal connection between the first end of the elongate linkage and the second handle, the first set of ratchet teeth and the second set of ratchet teeth being arranged on the pawl for alternate engagement of the first set of ratchet teeth and the second set of ratchet teeth with the ratchet teeth of the second jaw member to alternatively drive the second working surface of second jaw member towards and away from the first working surface of the first jaw member; a spring member pivotally mounted along the elongate linkage and having a first end operably coupled with the pawl so as to pivot the pawl and an opposing second end extending away from the pawl and towards the first end of the elongate linkage; a manual actuator rotatably mounted on the elongate linkage; and at least a first cam on the manual actuator rotatable to a first over-center position against the second end of the spring member so as to pivot the spring member and thereby pivot the pawl and the first set of ratchet teeth of the pawl into driving engagement with the second jaw member ratchet teeth, bias of the spring member maintaining the first cam and the manual actuator in the first over-center position.

BRIEF DESCRIPTION OF THE DRAWINGS

The foregoing summary, as well as the following detailed description of the preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings:

FIG. 3 is a side elevational view of the hand-held ratchet tool shown in FIG. 1;

FIG. 4 is an enlarged, elevational view of the elongated linkage and driving mechanism of the hand-held ratchet tool of FIG. 2, seen through a partially broken away second jaw, in a disengaged configuration;

FIG. 5 is an enlarged, partially broken away elevation view of the components of FIG. 4 in a first engaged configuration; and FIG. 6 is an enlarged, partially broken away elevation view of the components of FIG. 4 in a second engaged configuration.

DESCRIPTION OF THE PREFERRED EMBODIMENT

Figure 1:
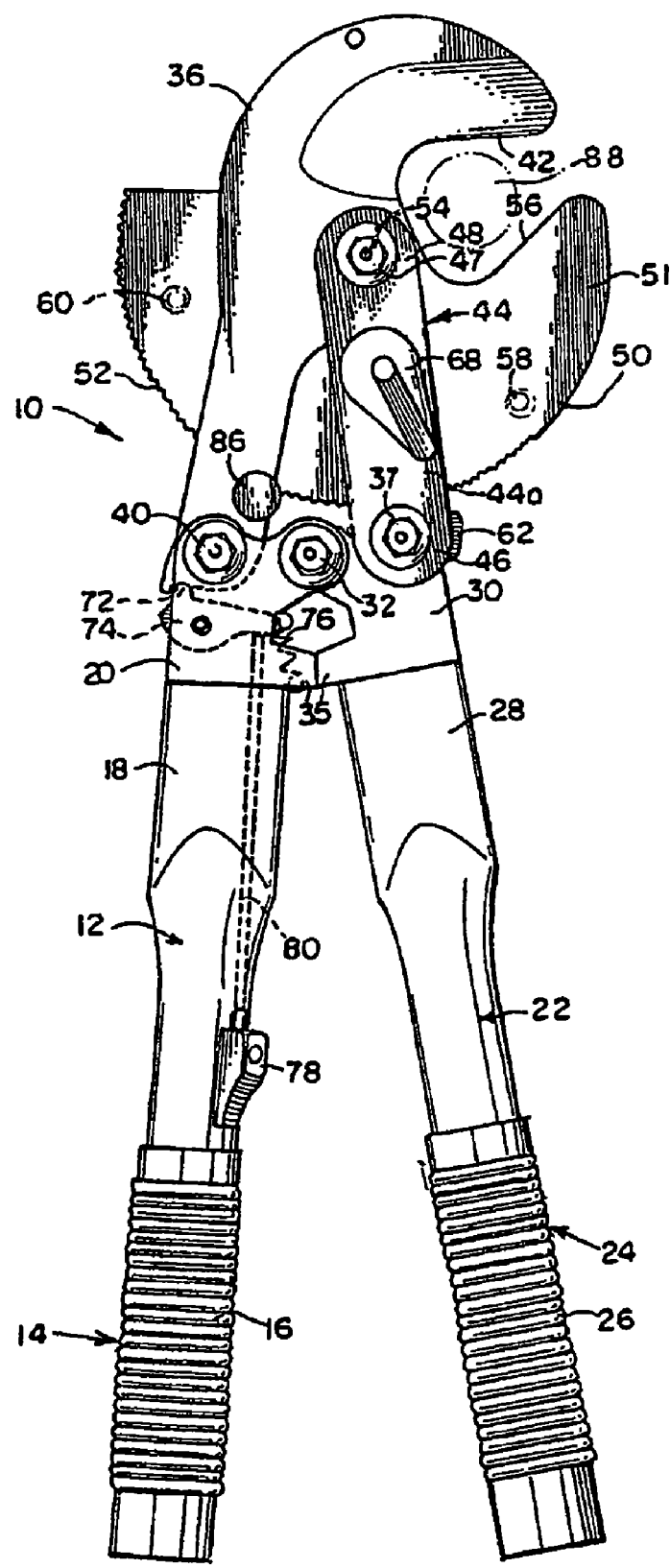
FIG. 1 is a front elevational view of a hand-held ratchet tool in accordance with the present invention.

Certain terminology is used in the following description for convenience only and is not limiting. The words "right," "left," "lower," and "upper" designate directions in the drawings to which reference is made. The words "inwardly" and "outwardly" refer to directions toward and away from, respectively the geometric center of the hand-held ratchet tool and designated parts thereof. The terminology includes the words above specifically mentioned, derivatives thereof, and words of similar import.

Referring to the drawings in detail, wherein like numerals indicate like elements throughout, there is shown in FIGS. 1 through 4 a preferred embodiment of a hand-held ratchet tool in accordance with the present invention. FIG. 1 illustrates a hand-held ratchet tool for controllably moving working surfaces of a pair of jaw members toward and away from each other and is generally designated 10. In the present embodiment, it is preferred that the hand-held ratchet tool 10 be used in conjunction with cutting cable. However, it is understood by those skilled in the art that the present invention is applicable to other uses where the working surfaces of a pair of jaw members are moved toward and away from each other. For example, the hand-held ratchet tool 10 could readily be adapted to function in a manner similar to pliers or vise grips (not shown).

As shown in the figures, the hand-held ratchet tool 10 comprises a first elongated handle 12 and a second elongated handle 22. The first handle 12 has a first end 14, preferably including a handle grip 16 mounted thereon for a user to grip, and a second end 18. The second handle 22 likewise has a first end 24, preferably including a handle grip 26 mounted thereon for a user to grip, and a second end 28. Preferably, both elongated handles 12, 22 are constructed of a high strength material like steel. However, it is understood by those skilled in the art that the handle 12 could be constructed of other materials exhibiting such strength characteristics, such as fiberglass having a high modules of elasticity. Further, in the present embodiment, it is preferred that the handle grips 16, 26 be constructed of a polymer. However, it is apparent to the ordinarily skilled artisan that the handle grip can be constructed of other suitable materials, such as rubber.

For convenience and ease of description only, the remaining components of hand-held ratchet tool 10, described hereinafter, are preferably constructed of steel or other high strength material, except as may be noted. However, it is understood by those skilled in the art that the various components can be constructed of other material.

As shown particularly in FIG. 3, preferably first handle end 14 is generally cylindrically shaped, whereas the second end 18 is generally planar or flatly shaped and includes a generally U-shaped or clevis-like member 20 extending therefrom. The second end 28 of the second elongated handle 22 likewise includes a generally U-shaped or clevis-like member 30 extending therefrom.

Figure 2:
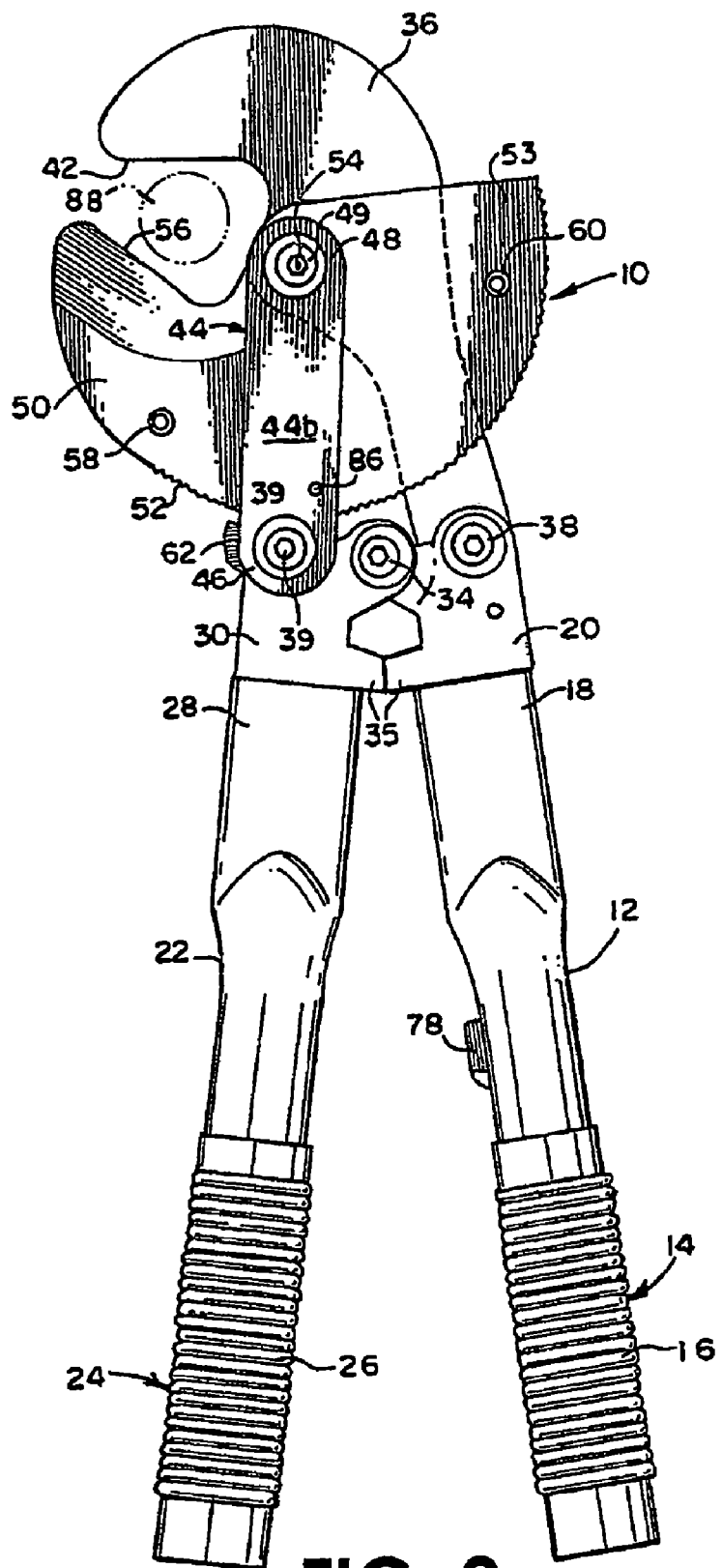
FIG. 2 is a rear elevational view of the hand-held ratchet tool shown in FIG. 1.

As shown in FIGS. 1 and 2, the second end 18 of the first elongated handle 12 is pivotally connected to the second end 28 of the second elongated handle 22. In the preferred embodiment, U-shaped members 20 and 30 of the first and second elongated handles 12 and 22, respectively, are pivotally connected along a common pivot axis by a bolt 34 which passes through suitably sized and aligned openings in U-shaped members 20 and 30. A nut 32 threadingly engages threads on the shank of the bolt 34 to hold the bolt 34 in place. While in the preferred embodiment, most of the pivotal connections are accomplished by the use of bolts, it is apparent to those skilled in the art that other means can be used to effect the pivotal connections, such as rivets or pins.

As shown in FIG. 1, a first jaw member 36 is pivotally mounted on the second end 18 of first handle 12 proximate the pivotal connection between the first and second handles 12 and 22. Preferably, first jaw member 36 is pivotally connected to first handle 12 in a manner similar to the pivotal connection between the first and second handles 12 and 22, that is, by a bolt 38 which extends through suitably aligned openings and is held in place by a nut 40. Preferably, first jaw member 36 is generally L-shaped and includes a first working surface preferably in the form of a beveled cutting edge 42 sharp enough to shear cable.

As shown in FIGS. 1 and 2, an elongate linkage general designated 44, has a first end 46 and an opposing second end 48. The first end 46 is pivotally mounted on second end 28 of the second handle 22 proximate the pivotal connection between the first and second handles 12 and 22. In the preferred embodiment, the first end 46 of the elongate linkage 44 is pivotally connected to the second end 28 of the second handle 22 through U-shaped member 30, by a pivotal connection provided by a bolt 39 which extends through suitably sized and aligned openings and is held in place by a nut 37. As shown in FIG. 3, it is preferred that elongate linkage 44 be comprised of a first member 44a and a second member 44b, each being a separate plate connected to different legs of U-shaped member 30 by bolt 39. The use of second linkage member 44b adds to the structural integrity of hand-held ratchet tool 10 while at the same time helps define the closed position of the jaw members, as described hereinafter.

As shown in FIGS. 1 and 2, second end 48 of elongate linkage 44 and a second jaw member 50 are pivotally connected with the first jaw member 36 so as to pivot on the first jaw member 36 along a common axis 54 provided by a central axis of a bolt 49 which extends through suitably sized and aligned openings and is held in place by a nut 47. Second jaw member 50 has an outer perimeter including a plurality of ratchet teeth 52 for receiving a pawl as described hereinafter and a second working surface preferably in the form of a beveled cutting edge 56, sharp enough to shear cable. Edge 56 is operatively associated with the cutting edge 42 of first jaw member 36 for cutting cable by being juxtaposed to the cutting edge 42 of the first jaw member. Preferably, second jaw member 50 is generally semi-circular in shape with the plurality of ratchet teeth 52 positioned about the circumference thereof.

Second jaw member 50 further preferably includes stop means for limiting the relative movement of first jaw member 36 with respect to second jaw member 50. The stop means for limiting the relative movement of first and second jaw members 36 and 50, in the present embodiment comprises pegs 58 and 60 which preferably encounter the second member 44b of elongate linkage 44 as second jaw member 50 moves with respect thereto. The pegs 58 and 60 encounter second member 44b at the point where the jaw members are fully closed and fully opened, respectively. Preferably, pegs 58 and 60 are generally circular in cross section and are frictionally mounted within generally circular holes in second jaw member 50. Furthermore, pegs 58 and 60 are flushly mounted (shown in phantom) on the surface 51 of second jaw member 50 so as to allow first jaw member 36 and second jaw member 50 to assume a facing relationship. However, pegs 58 and 60 depend outwardly from the surface 53 of second jaw member 50 away from first jaw member 36 so as to encounter elongate linkage 44 when the first and second jaw members assume their fully open and closed positions.

In the present embodiment, the handles 12 and 22 have a respective range of motion from a first position (as shown in FIG. 1) where the handles 12 and 22 are closest together with respect to each other to a second position (not shown) where the first ends of the handles 12 and 22 are furthest apart from each other. Each U-shaped member 20 and 30 includes a stop member 35 projecting towards the other respective U-shaped member. The handles are in the first position when the stop members 35 are engaged. The handles are in the second position when the first member 44a of elongate linkage 44 contacts the stop disc 86 positioned on jaw member 36.

Referring now to FIG. 4, a drive means is mounted on the second end 28 of second handle 22 and is drivingly connected to the ratchet teeth 52 for driving second jaw member 50 with respect to first jaw member 36 when the first and second handles 12 and 22 are moved with respect to each other. In the presently preferred embodiment, the drive means is a pawl 62 pivotally mounted between the legs of U-shaped member 30 of second handle 22 preferably for the same bolt 39 providing the pivotal connection between elongate linkage 44 and second handle 22. Pawl 62 has a first set of ratchet teeth 64 and a second set of ratchet teeth 66 at opposite ends thereof, which can be selectively alternatively biased into engagement with ratchet teeth 52 of second jaw member 50 for alternatively driving the second working surface 56 of the second jaw member 50 towards and away from the first working surface 42 of the first jaw member 36, as described in more detail hereinafter.

As shown in FIGS. 1 and 4-6, hand-held ratchet tool 10 further includes selective biasing means operatively associated with pawl 62 and mounted on the elongate linkage 44 for selectively biasing either the first set of pawl ratchet teeth 64 or the second set of pawl ratchet teeth 66 into engagement with ratchet teeth 52 of second jaw member 50. In the presently preferred embodiment, the selective biasing means comprises a manual actuator in the form of a knob or lever 68 rotatably mounted on first linkage member 44a and operating on pawl 62 through a spring member 70 for selectively engaging either the first set of ratchet teeth 64 or the second set of ratchet teeth 66 of pawl 62 into driving engagement with second jaw member ratchet teeth 52. Preferably, spring member 70 has a first end 70a engaged with the pawl 62 so as to pivot the pawl 62 and an opposing second end 70b extending away from the pawl 62 and toward the second end 48 of the elongate linkage 44. Preferably, spring member 70 is a torsional spring with a central loop 70c which is captured on a spring member pivot 71 in the form of a screw or bolt or like member located along the elongate linkage 44 between the pawl 62 and the knob 68.

FIGS. 4-6 are rear elevation views with linkage 44b removed and second jaw 50 partially cut away to reveal the hidden side of elongate linkage member 44a. FIG. 4 shows knob 68 and spring 70 of the selective biasing means and the pawl 62 in a neutral position 90 in which the pawl teeth 64, 66 are not engaged with the ratchet teeth 52 of second jaw member 50. In that position, the second end 70b of spring 70 extends between first and second cams in the form of a pair of studs 68a, 68b protruding from knob 68. Knob 68 is rotatable about its center axis 44' in either direction from the indicated neutral position to set the pawl 62 into engagement with the ratchet teeth 52 of second jaw 50. FIG. 5 depicts the knob 68 rotated approximately 120° in a counter-clockwise direction (as seen in FIG. 1) from the neutral position in FIG. 4 into a first operative, over-center position 92 in which the first set of ratchet teeth 64 is biased into engagement with second jaw member ratchet teeth 52. As depicted in FIG. 6, the knob 68 is further rotatable to the same extent in a clockwise direction (viewed from the front of the tool 10) into a second operative, over-center position 94, which is substantially a mirror image of FIG. 5, such that second set of ratchet teeth 66 are biased into engagement with second jaw member ratchet teeth 52. Preferably, a stop 69 (in phantom) is provided to limit further rotations of the knob 68 in either direction after reaching an over-center position. In this way, each stud 68a or 68b that is rotated past a center position of spring 70, as well as the knob 68 itself, is biased away from the neutral position as shown in FIG. 4 by the spring 70 bearing against the stud 68a or 68b. The knob 68 is held between the spring 70 and the stop 69 by the spring 70 in either respective rotated over-center position. The stop 69 provides positive feedback to the user that the knob 68 is fully rotated to its over-center position.

The invention is not limited to 120° rotational movements of the knob 68. All that is necessary is that the knob 68 be rotatable sufficiently to permit either stud 68a, 68b to pass a center position to an "over-center" position with respect to the spring 70. The center position is where the line of force applied by the spring member 70 to the stud 68a or 68b passes though the center of the knob 68, which is the axis of rotation of the knob. Stated another way, the center position is where a perpendicular from the tangent at the point of contact between the spring member 70 and the stud 68a or 68b passes through the center of the knob. The center position is also where the spring member 70 is positioned farthest from the center of the knob 68. The center position is indicated by phantom line 67 in FIG. 5.

Referring now to FIG. 1, inhibiting means is mounted on first handle 12 for limiting the relative movement of first handle 12 with respect to second handle 22, whereby the relative movement of first jaw member 36 with respect to second jaw member 52 is likewise inhibited. The inhibiting means has a first position (shown in FIG. 1) and a second position (not shown) such that the relative movement is less in the first position than in the second position.

In the presently preferred embodiment, the inhibiting means comprises a shoulder 72 positioned on first jaw member 36 and a finger 74 pivotally mounted on first handle 12, preferably on U-shaped member 20, proximate shoulder 72. Finger 74 is biased into engagement with first jaw member 36 in the first position (as shown in FIG. 1) such that finger 74 engages shoulder 72 to limit the relative movement between first jaw member 36 and first handle 12, which, in turn, limits the relevant movement between the first and second handles and jaw members. Finger 74 is preferably biased into engagement with first jaw member 36 by a spring 76 interconnected between finger 74 and stop member 35 on second end 18 of first handle 12, as shown in FIG. 1.

The inhibiting means further includes actuator means reciprocally mounted on first handle 12 for allowing the user to select the first or second position. In the preferred embodiment, the actuator means is preferably a thumb slide 78 reciprocally mounted on the first handle 12. Thumb slide 78 is preferably constructed of a polymer, but it is apparent to those skilled in the art that thumb slide 78 can be constructed of other suitable materials, such as steel. Thumb slide 78 is operatively engaged with finger 74 by an elongated bar 80 for pivoting finger 74 into the second position (not shown) whereby finger 74 cannot engage shoulder 72 and inhibit the relative movement between the handles 12 and 22 and jaw members 36 and 50.

When the first set of ratchet teeth 64 are biased into engagement with ratchet teeth 52 of second jaw member 50 by rotating knob 68 into the first operative position (as shown at 92 in FIG. 5), relative movement between and reciprocation of first and second handles 12 and 22 moves cutting edge 56 of the second jaw member 50 toward the cutting edge of 42 of the first jaw member 36. This is so, because first set of ratchet teeth 64 are in an intermeshing relationship with the second jaw member ratchet teeth 52 to directly drive the second jaw member 50 when pawl 62 is moved in a first direction 82 and are in an overrunning relationship with second jaw member ratchet teeth 52 when pawl 62 is moved in a second, opposing direction 84.

When second set of ratchet teeth 66 are biased into engagement with second jaw member ratchet teeth 52 by rotating the knob 68 into the second operative position (94 in FIG. 6), relative movement between or reciprocation of first and second handles 12 and 22 moves the beveled cutting edge 56 of the second jaw member 50 with respect to the beveled cutting edge 42 of the first jaw member 36 in a second direction or away from each other to the open position. This results because when second set of ratchet teeth 66 are biased into engagement with second jaw member ratchet teeth 52, second set of ratchet teeth 66 are in an overrunning relationship with second jaw member ratchet teeth 52 when pawl 62 is moved in the first direction 82 and the second set of ratchet teeth 66 are in an intermeshing relationship with the second jaw member ratchet teeth 52 to directly drive the second jaw member 50 when pawl 62 is moved in the second direction 84.

With respect to the operation of the inhibiting means, as the handles 12 and 22 move from the second position where they are furthest apart to the first position where they are closest together with respect to each other, the cutting force applied by the jaw members 36 and 50 is increased due to the linkage of the ratchet-tool 10 and shape of second jaw member 50. By placing the inhibiting means in the first position, the handles can only move from the first position where they are closest together to an intermediary position, where the handles 12 and 22 are not furthest apart. This effectively, limits the range of movement of the handles to an area where the most cutting force is generated. When the inhibiting means is placed in the second position, the handles have a full range of motion, thereby allowing the jaw members 36 and 50 to quickly move from the open to the closed position and vice versa, thereby saving time.

In the preferred embodiment, when the handles 12 and 22 are moved from their first position to the intermediary position, three (3) ratchet teeth 52 on second jaw member 50 are overrun when first set of ratchet teeth 64 are biased into engagement with ratchet teeth 52. Similarly, when the handles 12 and 22 are moved from their first position to the second position eight (8) ratchet teeth 52 on second jaw member 50 are overrun. When the second set of ratchet teeth 66 are biased into engagement with ratchet teeth 52 a similar result is obtained. It will be apparent to those skilled in the art that the range of motion of the handles can be varied as desired. For example, pawl 62 could overrun ten or five teeth to obtain a two to one ratio.

In use, first jaw member 36 and second jaw member 50 are positioned in the fully opened position so that they surround a cable 88, as shown FIGS. 1, 2 and 4 in phantom. The thumb slide 78 is moved to the second position and the knob 68 is placed in the first operative position. The handles 12 and 22 are then moved towards and away from each other to quickly close the jaws 36 and 50 about the cable 88. When the jaws engage the cable 88, thumb slide 78 is moved to the first position and the handles 12 and 22 are moved towards and away from each other to close the jaws with power until the cable 88 is completely cut. Then, knob 68 is placed in the second operative position (FIG. 6) and the thumb slide 78 is moved to the first position. The handles 12 and 22 are then moved towards and away from each other so that the jaw members 36 and 50 are quickly opened to prepare the hand-held ratchet tool 10 for the next cutting operation.

From the foregoing description, it can be seen that the present invention comprises a hand-held ratchet tool for moving a pair of jaw members towards and away from each other. It will be appreciated by those skilled in the art that changes could be made the embodiment described above without departing from the broad inventive concept thereof. It is understood, therefore, that this invention is not limited to the particular embodiment disclosed, but it is intended to cover all modifications which are within the scope and spirit of the invention as defined by the appended claims.

I claim:

1. A hand-held ratchet tool for controllably moving working surfaces of a pair of jaw members toward and away from each other, the hand-held ratchet tool comprising:
    a first elongated handle having a first end and a second end;
    a second elongated handle having a first end and a second end, the second end of the first handle being pivotally connected to the second end of the second handle;
    a first jaw member pivotally mounted on the second end of the first handle, the first jaw having a first working surface;
    an elongate linkage having a first end and an opposing second end, the first end being mounted on the second end of the second handle by a pivotal connection so as to pivot the elongate linkage about an axis through the second end of the handle;
    a second jaw member having an outer perimeter including a plurality of ratchet teeth and a second working surface, the second jaw member and the second end of the elongate linkage being connected with the first jaw member to pivot on the first jaw member along a common pivot axis;
    a pawl having a first set of ratchet teeth and a separate second set of ratchet teeth, the pawl being mounted on the second end of the second handle so as to pivot on the axis of the pivotal connection between the first end of the elongate linkage and the second handle, the first set of ratchet teeth and the second set of ratchet teeth being arranged on the pawl for alternate engagement of the first set of ratchet teeth and the second set of ratchet teeth with the ratchet teeth of the second jaw member to alternatively drive the second working surface of second jaw member towards and away from the first working surface of the first jaw member;
    a spring member pivotally mounted along the elongate linkage and having a first end operably coupled with the pawl so as to pivot the pawl and an opposing second end extending away from the pawl and towards the second end of the elongate linkage;
    a manual actuator rotatably mounted on the elongate linkage; and
    at least a first cam on the manual actuator rotatable to a first over-center position against the second end of the spring member so as to pivot the spring member and thereby pivot the pawl and the first set of ratchet teeth of the pawl into driving engagement with the second jaw member ratchet teeth, bias of the spring member maintaining the first cam and the manual actuator in the first over-center position.

2. The hand-held ratchet tool as recited in claim 1 further comprising a second cam on the manual actuator, the second cam being movable by an opposite rotation of the manual actuator to a second over-center position against the second end of the spring member so as to bias the spring member and thereby pivot the pawl and the second set of ratchet teeth of the pawl into driving engagement with the second jaw member ratchet teeth, bias of the spring member maintaining the second cam and the manual actuator in the second over-center position.

3. The hand-held ratchet tool as recited in claim 1 further comprising a stop positioned to capture the first cam and the manual actuator with the spring member in the first over-center position.

4. The hand-held ratchet tool as recited in claim 3 wherein the spring member is a torsion spring.

5. The hand-held ratchet tool as recited in claim 4 wherein the spring member has a loop located between the first and second ends and wherein the loop is captured on a pivot on the elongate linkage.

6. The hand-held ratchet tool as recited in claim 1 wherein the spring member is a torsion spring.

7. The hand-held ratchet tool as recited in claim 6 wherein the spring member has a loop located between the first and second ends and wherein the loop is captured on a pivot on the elongate linkage.

8. The hand-held ratchet tool as recited in claim 1 wherein the first jaw member is generally L-shaped and the first working surface includes a cutting edge and wherein the second jaw member is generally semi-circular shaped, the second jaw member having the plurality of ratchet teeth positioned about a circumference edge thereof and the second working surface including a cutting edge facing the cutting edge of the first jaw member.

9. The hand-held ratchet tool as recited in claim 1 wherein the second jaw member further includes stop means for limiting relative movement of the first jaw member with respect to the second jaw member.

10. The hand-held ratchet tool as recited in claim 1 further including inhibiting means mounted on one of the first and second handles for limiting relative movement of the first handle with respect to the second handle, whereby relative movement of the first jaw member with respect to the second jaw member is likewise inhibited, the inhibiting means having a first position and a second position such that the relative movement is less in the first position than in the second position.

11. The hand-held ratchet tool as recited in claim 10 wherein the inhibiting means is biased into the first position.

12. The hand-held ratchet tool as recited in claim 10 wherein the inhibiting means further includes actuator means reciprocally mounted on the one handle for allowing the user to select the first or second position.

13. The hand-held ratchet tool as recited in claim 10 wherein the inhibiting means includes a shoulder positioned on the first jaw member and a finger pivotally mounted on the first handle proximate the shoulder, the finger being biased into engagement with the first jaw member in the first position such that the finger engages the shoulder to limit the relative movement.

14. The hand-held ratchet tool as recited in claim 13 wherein the inhibiting means further includes a manual actuator reciprocally mounted on the first handle, the manual actuator being operatively engaged with the finger to pivot the finger into the second position whereby the finger cannot engage such shoulder and inhibit the relative movement between the first and second jaw members.

15. The hand-held ratchet tool as recited in claim 2 further comprising a stop positioned to capture the first cam and the manual actuator with the spring member in the first over-center position.

16. The hand-held ratchet tool as recited in claim 15 wherein the spring member is a torsion spring.

17. The hand-held ratchet tool as recited in claim 16 wherein the first jaw member is generally L-shaped and the first working surface includes a cutting edge and wherein the second jaw member is generally semi-circular shaped, the second jaw member having the plurality of ratchet teeth positioned about a circumference edge thereof and the second working surface including a cutting edge facing the cutting edge of the first jaw member.

18. The hand-held ratchet tool as recited in claim 17 wherein the spring member has a loop located between the first and second ends and wherein the loop is captured on a pivot on the elongate linkage.

19. The hand-held ratchet tool as recited in claim 18 wherein the second jaw member further includes stop means for limiting relative movement of the first jaw member with respect to the second jaw member.

20. The hand-held ratchet tool as recited in claim 19 further including inhibiting means mounted on one of the first and second handles for limiting relative movement of the first handle with respect to the second handle, whereby relative movement of the first jaw member with respect to the second jaw member is likewise inhibited, the inhibiting means having a first position and a second position such that the relative movement is less in the first position than in the second position.

\* \* \* \* \*